United States Patent [19]

Wuertz

US005220131A

[11] Patent Number: 5,220,131
[45] Date of Patent: Jun. 15, 1993

[54] POKE-THROUGH FIRE BARRIER STRUCTURE WITH KNOCK-OUT OPENINGS

[75] Inventor: Emil S. Wuertz, Madison, Conn.

[73] Assignee: Hubbell Incorporated, Orange, Conn.

[21] Appl. No.: 685,425

[22] Filed: Apr. 15, 1991

[51] Int. Cl.⁵ ............................................. H02G 3/22
[52] U.S. Cl. ........................................... 174/48; 169/48
[58] Field of Search ........................... 174/48; 169/48; 252/606; 52/221

[56] References Cited

U.S. PATENT DOCUMENTS

| | | | |
|---|---|---|---|
| 3,864,883 | 2/1975 | McMarlin | 52/221 |
| 4,099,020 | 7/1978 | Kohaut | 174/48 |
| 4,232,493 | 11/1980 | Gray et al. | 52/221 |
| 4,336,416 | 6/1982 | Goodsell | 174/48 |
| 4,433,204 | 2/1984 | Wuertz | 174/48 |
| 4,638,115 | 1/1987 | Benscoter | 174/48 |
| 4,770,643 | 9/1988 | Castellani et al. | 439/135 |
| 4,899,018 | 2/1990 | Sireci | 174/48 |

*Primary Examiner*—Leo P. Picard
*Assistant Examiner*—David A. Tone
*Attorney, Agent, or Firm*—Jerry M. Presson; Leopold Presser

[57] ABSTRACT

A poke-through fire barrier with knock-out fire barrier openings. The structure includes a fire barrier element which is constituted from an intumescent material in the shape of a disc member which is adapted to be installed in a passage or opening formed in a fire-rated floor, and wherein the intumescent disc member incorporates one or more knock-outs for the passage therethrough of insulated conductors or wires.

8 Claims, 2 Drawing Sheets

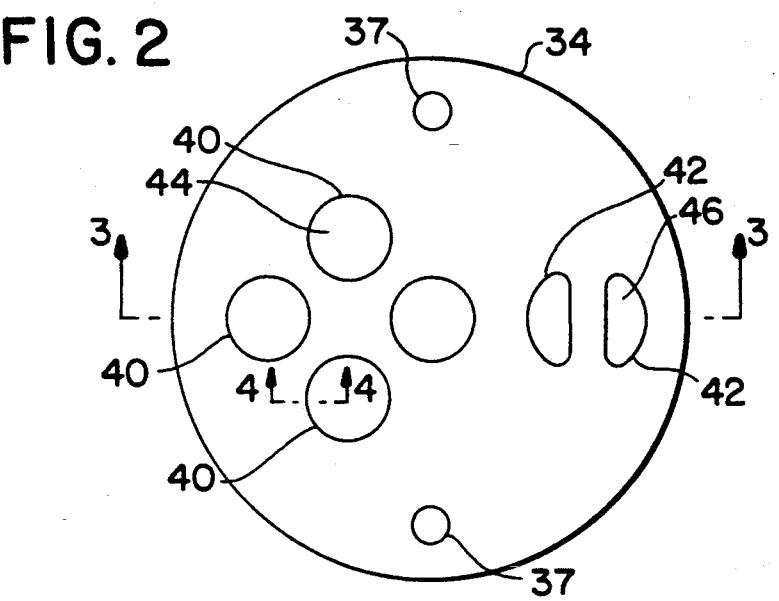
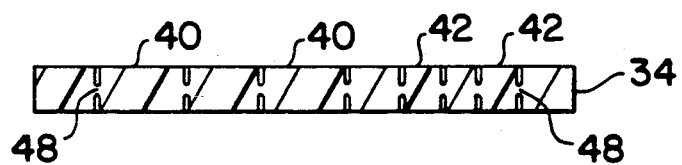
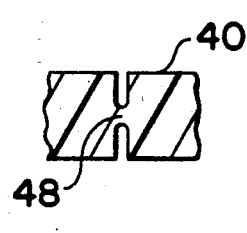

POKE-THROUGH FIRE BARRIER STRUCTURE WITH KNOCK-OUT OPENINGS

BACKGROUND OF THE INVENTION

1. Field of the Invention

The present invention relates in general to poke-through fire barrier structures and, more particularly, to an improved and novel poke-through fire barrier with knock-out fire barrier openings. Moreover, the invention relates to a novel fire retarding structure including a fire barrier element which is constituted from an intumescent material in the shape of a disc member and is adapted to be installed in a passage or opening formed in a fire-rated floor, and wherein the intumescent disc member incorporates knock-outs for the passage therethrough of insulated conductors or wires.

In the construction of buildings of various types, such as modern office buildings possessing concrete floors, it is frequently necessary to provide fire-rated feed-through fittings for conducting insulated conductors, wires, cables and the like through holes or passages which are formed in the concrete building floor, through the intermediary of which electrical power and other signals such as telecommunication signals may be readily transmitted from a source, for instance, a junction box located at one face of the concrete floor through the opening or passage formed in the floor to a suitable outlet or service head positioned at the opposite face of the floor.

Hereby, in order to accomplish the foregoing purpose, it has generally been customary to insert a feed-through fitting having a poke-through fire barrier into the opening in the concrete floor, pass the insulated conductor or conductors through the fitting and fire barrier from one face of the floor to the other face of the floor, and produce connections with an electrical outlet or service mounted over the opening in the floor, generally the top face of the floor. Although this type of fire-rated transmission of electrical power and telecommunication signals from one floor to another of a building structure, such as a modern office building, is widely employed in the construction industry, difficulties have been encountered in containing fires which are encountered on one floor of the building so as to prevent the fire and heat generated thereby from spreading through the floor passages to the floor located thereabove, with such fires and resultant heat ordinarily being conducted along the insulated wires or conductors and melting the insulation thereof while conducting heat to the upper floor causing the conflagration to rapidly spread.

Currently, in order to counteract problems which have resulted from the propagation of fires from one floor to another of such buildings due to fire and heat being conducted through the openings formed in the fire-rated concrete floors, suitable fire-rated feed-through fittings possessing fire barrier structures have been developed in the technology in which it is intended to provide the fewest possible heat conductive components, and to also incorporate fire-retarding barriers in the floor holes or passages and which, in the presence of fire and heat, will act to effectively form seals about the insulated conductors and concurrently seal the opening or passageway in the concrete floor by essentially expanding so as to inhibit or at least appreciably retard the transmission of heat and fire from one side of the concrete floor to the opposite side thereof, in essence, to the next or upper floor of the building. In order to achieve the foregoing, provision has been made for the installation of suitable fire retarding elements; for example, in the shape of disc members constituted from an expandable fire-retarding material, such as an intumescent material, with holes being preformed therein to permit the conductance therethrough of the insulated conductors, and which elements upon being subjected to fire and heat will rapidly expand so as to seal the floor passage and about the wires or conductors extending through the intumescent disc members.

2. Discussion of the Prior Art

An apparatus for sealing passages through a concrete floor and about an insulated conductor, which provides for disc or plate members consisting of an intumescent material arranged in the passages of a concrete floor is described in Kohaut U.S. Pat. No. 4,099,020. Hereby, in the presence of heat and fire, the plate members of intumescent material expand and essentially seal the passageway. Moreover, a framework or lattice structure of such expandable intumescent material is also provided in the passageway located either below or above the intumescent material plate members so as to further aid in the closing and sealing off of the floor passage in the presence of heat or fire.

Similarly, Castellani, et al. U.S. Pat. No. 4,770,643; Spencer U.S. Pat. No. 4,496,790 and McMarlin U.S. Pat. No. 3,864,883 each disclose different types of poke-through fittings and fire barriers which are employed in passages formed in the concrete floors of building structures, wherein intumescent material is employed to provide a sealing effect about insulated or electrical conductors and to also sealingly contact the walls of the passage upon expansion so as to form a barrier inhibiting or at least retarding the propagation of the fire from one floor to another of the building.

Moreover, Goodsell U.S. Pat. No. 4,336,416, commonly assigned to the assignee of the present invention, and the disclosure of which is incorporated herein by reference, discloses a fire-rated feed-through fitting for transferring insulated wires through a passage formed in a concrete floor of a building structure, such as a multi-storied office building, and in which a plurality of spaced disc members each constituted from an intumescent material is interposed in the passage between electrical junction and outlet boxes located on opposite sides of the floor such that, upon the occurrence of fire and resulting heat at the floor below, the intumescent disc members will expand and seal the insulated conductors and the passage to inhibit or retard the spread of fire therethrough to the upper floor. In connection with the structure disclosed in this patent, a plurality of such fire barriers may be spaced within the length of the passage in the concrete floor to enable the arrangement of a plurality of heat sinks to lower the temperature from the encountered fire at the level of the upper floor, thereby reducing the propagation of heat and fire through the floor passage.

Although the foregoing installations of fire-rated fittings with poke-through fire barriers, the latter of which are ordinarily made from intumescent materials in disc or plate-like shapes having preformed openings therein to allow conductors or wires to extend through, with the openings being made as small as possible such that the intumescent material upon expansion thereof in response to the heat from a fire, can seal around the insulated wires even while the insulation thereof is burning and melting off, the current need for ever larger cables or numbers of cables being conducted through such poke-through fittings necessitate the formation of larger preformed openings in the fire barriers. Consequently, this has necessitated the installation of auxiliary fire-barrier material in the form of rigid pieces of intumescent material or as a putty which intumesces in the floor passage when exposed to heat and/or fire so as to produce a sealing effect. The installation of such auxiliary fire barriers to prevent the propagation of heat or fire through the floor passage, in view of the presence of large preformed openings in the fire barriers which are constituted from intumescent material plates or disc members, is quite difficult to handle by an electrician or possibly inadequately skilled personnel, and may not be properly installed as required and specified by the manufacturer. Consequently, the fire barrier material if not properly installed may fail to seal off the floor passage at the occurrence of a fire in the absence of proper installation of such auxiliary fire barrier material. This may subject the installer and the manufacturer to legal liabilities in the event of damage being sustained as a result of fire spreading through such passages and improperly installed poke-through fire barriers in building structures.

SUMMARY OF THE INVENTION

In order to eliminate or substantially ameliorate problems encountered with regard to inadequate sealing being afforded by present fire barriers of the poke-through type in which the fire barriers are generally constituted of an expandable intumescent material as one or more disc members with preformed holes therein, which are arranged in the passages in a concrete floor, facilitating a plurality of cables or insulated conductors to extend therethrough; rather than providing the intumescent disc member with a plurality of relatively large preformed holes which would be difficult to seal off in the event of a fire and in the absence of properly installed auxiliary fire barrier material, the invention contemplates the provision of fire barriers of the type described in which a large number of wires and large diameter wires or insulated conductors can be passed therethrough without the necessity of having to provide for the presence of one or more large preformed openings which conceivably may not be readily sealed off upon the occurrence of a fire.

Hereby, the inventive fire barrier, in the form of a disc member or members constituted from an intumescent material which expands in the presence of heat and/or fire, incorporates at least one but preferably a plurality of knock-outs which may be of different sizes and which may be selectively knocked out in correlation with the size and quantity of cables or insulated conductors intended to be passed through the fire barrier. Accordingly, an installer need merely utilize a simple tool, such as a screwdriver, to selectively push or punch out one or more of the knock-outs as needed and then to feed the insulated conductor or plurality of conductors therethrough. The remaining knock-outs of the disc member remain in place so as to provide essentially closed or plugged holes which are not passed through by heat and fire, and whereby the openings formed through the removed knock-outs are selected in size to be in such close conformance with the dimensions of the insulated conductors extending therethrough, so as to readily be able to seal in the presence of heat and/or fire due to the expansion of the intumescent material, thereby imparting assurance that the spread of fire to an upper floor through the passage formed in the concrete floor will be inhibited or at least considerably retarded.

Although plate or disc members incorporating knock-outs which are utilized in conjunction with electrical equipment, such as fittings and junction boxes, are well-known in industry, none of these are directed to the formation of fire barriers in the shape of disc members constituted from an intumescent material, and adapted to be installed in a passage formed in a concrete floor.

Thus, Benscoter U.S. Pat. No. 4,638,115 discloses an afterset for a cellular raceway which is adapted to be mounted over an opening formed in a concrete floor and may be flush mounted on the floor for the distribution of electrical power cables and communication systems in office buildings or the like. In this instance, the afterset includes a plurality of cover plates or discs which are each provided with knock-outs to permit the through passage of insulated conductors or cables dimensioned in close correlation with the sizes of the knock-outs.

Sireci U.S. Pat. No. 4,899,018 discloses an electrical junction box containing knock-outs for the passage therethrough and juncture of cable connectors. Moreover, Wuertz U.S. Pat. No. 4,433,204 discloses a junction box for poke-through floor fittings which also includes knock-outs to provide for the connection and through passage of electrical cable terminals or connectors. Although the above-mentioned patents each disclose knock-outs in connection with various electrical components, none of these knock-outs are formed in the components of intumescent fire barriers which are installed in the passages of a concrete floor employed to convey electrical conductors from one floor to another of a building structure Accordingly, it is an object of the present invention to provide a poke-through fire barrier including knock-outs which are selectively removable so as to facilitate the passage therethrough of insulated conductors and the like.

Another object of the present invention is to provide a fire retarding structure in which a fire barrier consisting of at least one disc member constituted from an intumescent material is arranged in a passage or opening formed in a concrete floor of a building structure, and with insulated conductors or wires able to be passed through openings in the disc member formed by the selective punching out of one or more knock-outs in the disc member, which are sized in conformance with the external dimensions of the conductors intended to be passed through the formed holes.

Yet another object of the present invention is to provide a poke-through fire retarding structure for installation with fire-rated feed-through fittings for transferring at least one conductor to an opening formed in a fire-rated floor, in which the fire barrier includes one or more disc-shaped members of an intumescent material, and in which openings are formed during installation through the selective removal of one or more knock-outs in the disc members commensurate with the number and size of insulated conductors which are intended to be extended therethrough.

A still further object of the present invention is to provide a novel and unique disc member of intumescent material which incorporates selectively removable knock-outs and is adapted for installation in a fire retarding structure of a fire-rated feed-through fitting located in an opening or passage of a floor.

BRIEF DESCRIPTION OF THE DRAWINGS

Reference may now be had to the following detailed description of a preferred embodiment of the invention, taken in conjunction with the accompanying drawings; in which:

FIG. 2 illustrates, on an enlarged scale, a top plan view of a disc-shaped fire barrier of intumescent material utilized in conjunction with the structure of FIG. 1, and which incorporates selectively removable knock-outs for the through passage of insulated conductors and cables;

FIG. 3 illustrates a sectional view taken along line 3—3 in FIG. 2; and

FIG. 4 illustrates a fragmentary sectional view taken along line 4—4 in FIG. 2.

DETAILED DESCRIPTION OF PREFERRED EMBODIMENTS

Figure 1:
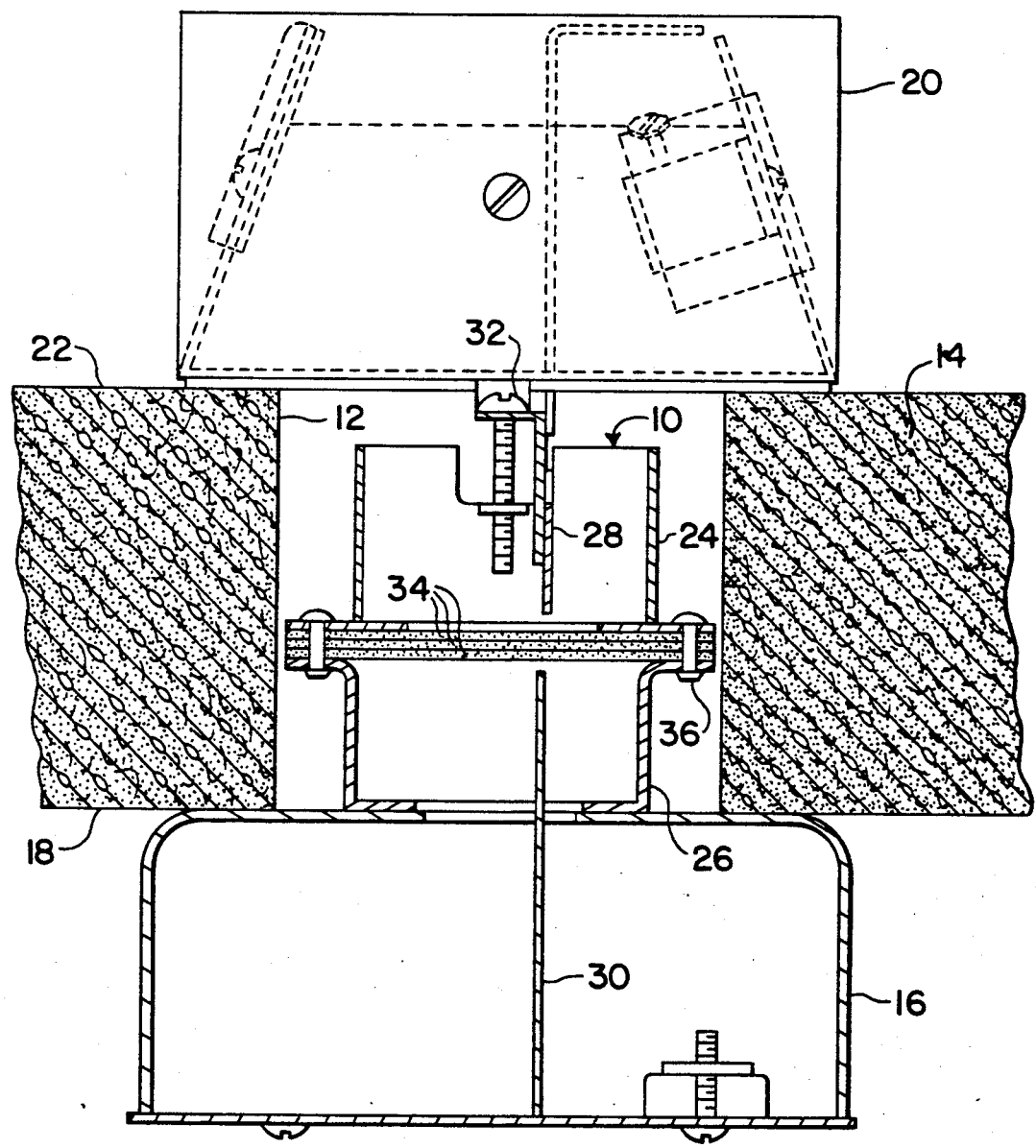
FIG. 1 illustrates a generally diagrammatic sectional view through a poke-through fire retarding structure installed in an opening in a fire-rated floor of a building.

Referring now in detail to the drawings, and specifically to FIG. 1, there is disclosed a typical exemplary fire retarding structure 10 in the form of a poke-through fire barrier for the sealing of a passage 12 provided in a concrete floor 14 of a building structure; for instance, such as an office building, manufacturing plant or the like. The passage 12 through the floor 14 allows for the transfer of suitable cables, insulated wires and telecommunication signals from a junction box 16 positioned at the bottom face 18 of the concrete floor 14 to an outlet or service head 20 arranged at the opposite or upper face 22 of the floor 14. For purposes of clarity, such cables and insulated wires which are used for the transmission of power and for telecommunication systems from one floor to another floor through passage 12 are not shown in the drawing.

By way of illustration, suitable tubular conduit sections 24 and 26 may be positioned, respectively, in the upper and lower end regions of the passage 12 and, if necessary provided with vertical dividers 28 and 30 for separating high and lower power conductors. The respective conduit sections may be fastened to the service head 20 by means of a screw fastener 32, and to the junction box 16 through a flange arrangement or the like. Obviously, other types of fastening means may be readily employed for mounting the service head and junction box on the opposite faces of the floor 14, such as clamps or other types of screw-type fasteners, which are not explained in detail herein and do not form part of the inventive concept.

In order to form a fire retarding structure 10 or fire barrier between the upper and lower cylindrical sections 24 and 26 in the passage 12, a plurality of disc members 34 are superimposed and held together by suitable bolt or screw type fasteners 36 extendable through holes 37 in disc members 34. Alternatively, rather than being directly superimposed in surface contact, the disc members 34 may be axially spaced relative to each other through the interposition of suitable spacers, such as discussed in Goodsell U.S. Pat. No. 4,336,416, which is commonly assigned to the assignee of the present invention. Each of the disc members 34 forms a fire barrier of the poke-through type, as is known in the technology, for the conveyance therethrough of one or more insulated conductors, wires, cables of different dimensions from the junction box 16 to the service head 20. Hereby, in the disclosed fire-retarding barrier, each of the disc members 34 is formed from an expandable intumescent material which, when exposed to a high degree of heat, generally due to a fire, will expand and seal off the passage 12 in the floor 14, while concurrently sealing about the wires even if the insulation thereof were to be burned off or melted due to the fire or heat. This, in effect, provides a fire barrier which will either completely inhibit or at least substantially retard the spread of fire as a result of the conductance of heat to the building area above the floor 14 from below through the passage 12. Ordinarily, as described in the above-mentioned U.S. Pat. Nos. 4,336,416, 4,364,883, 4,099,020 and 4,496,790, the fire barrier members or discs which are formed from intumescent material which is expandable in response to heat, each have preformed holes provided therein for the passage therethrough of one or more insulated conductors, cables or wires and the like, which material seals about the conductors as a result of the expansion of the intumescent material due to the heat, and thereby forms fire barriers at their locations. However, frequently, due to the necessarily large sizes of such preformed holes in the fire barriers which are required to accommodate large conductors, properly sealing about the conductors or wires during expansion of the intumescent material will not be effected, thereby necessitating the installation of auxiliary fire barriers in the form of putty or other filler materials constituted of similar kinds of intumescent materials which, if improperly installed, will fail to seal the conductors and allowing for the propagation of heat and fire to the building area above the floor, and possibly subjecting the installer and/or the manufacturer to legal liabilities.

Consequently, as shown in FIGS. 2 through 4 of the drawings, pursuant to the present invention the drawbacks of the prior art are eliminated in that each disc member 34 which is constituted from the expandable intumescent material, rather than being provided with preformed openings for the extension therethrough of insulated wires and cables, incorporates a plurality of knock-outs 40 and possibly 42 of different sizes and configurations, to be selectively punched out during installation by means of a suitable tool; i.e. a screwdriver, to enable the resultingly formed holes to receive one or more insulated cables or conductors, wires or the like, dimensioned to conform with and substantially fill the hole or holes. Hereby, the so-called plugs 44, and 46 when such are employed, are the intumescent material of the knock-outs 40 and 42. Prior to being selectively punched out, as needed, the plugs 44 and, when present, 46 are adhered to and integral with the remaining portion of each disc 34 through a fragile web connection 48 located in the center of the thickness of the disc member 34, in effect, recessed from the opposite surfaces of the disc, so as to enable each plug 44, 46 to be selectively punched out by an installer through applying an axial force thereto with the tool tending to shear through the web connections 48. The knock-outs 40, 42 can be readily formed by simply cutting suitable recesses with a steel rule die cutter into the disc 34 from both sides thereof, leaving the fragile web connection 48, for instance, of a thickness of about 0.04, to 0.06 inch for a disc thickness of about 0.25 inch in the center of the disc 34, as shown in FIGS. 3 and 4.

In this embodiment, each disc 34 has an outer diameter of about 2.875 to 3.0 inches. Formed in the disc 34 are a grouping of four knock-outs 40 towards one side of the center of the disc 34, each being about ½ inch in diameter. Towards the other side of the center of the disc 34, a second pair of knock-outs 42 each of substantially semi-circular wedge-shape is adapted to receive other sizes of insulated conductors. The size and number of knock-outs 40, 42 set forth herein are only illustrative and numerous other modifications and shapes thereof readily suggest themselves to one skilled in the art.

Alternatively, inasmuch as the semi-circular or wedge-shaped knock-outs 42 may be of relatively small sizes for the passage therethrough of small wires; rather than forming these openings 42 with knock-out plugs 46, they may be initially formed so as to be completely open inasmuch as their small size will enable them to provide the desired sealing action about any wires passed therethrough in the presence of heat and/or fire.

The intumescent material which is employed for each disc 34, of which one or more may be used superimposed for each fire barrier, for instance, may contain between about 70% to 100% by weight of an intumescing binder, such as sodium silicate or potassium silicate, and between 0 to 30% by weight of a filler for increasing the viscosity of the resultant foam. Such fillers may be clay, cellulatable glass or the like, although organic intumescent mixtures may also be employed to this effect. The surfaces of each disc member 34 may be coated with a suitable vinyl layer and in one specific application thereof may be produced by Alva-Tech Inc., Asbury Park, N.J. as an intumescent material sold under the name fire barrier FB 525 (vinyl coated).

When desired, the fire-retarding structure 10 incorporating the poke-through fire barrier, rather than being of an overall configuration as shown in FIG. 1, may be similar to that disclosed in Goodsell U.S. Pat. No. 4,336,416; however, with each disc 34 pursuant to the present invention being provided with the inventive knock-outs 44 and 46, which are dimensioned to conform with the type and number of insulated conductors or cables extending therethrough, rather than being provided with through openings which are preformed therein as in the above-mentioned U.S. patent, specifically as shown in FIG. 3 thereof.

Furthermore, it is also possible to provide an arrangement of intumescent fire barriers as shown in U.S. Pat. No. 4,336,416, wherein rather than employing intumescent discs 68 having large preformed openings therein, as shown in FIG. 3 of the patent, utilizing the inventive discs 34 of intumescent material which incorporate the selectively removable knock-outs 42 and 44 in conformance with the quantity and size of insulated conductors, cables and wires it is intended to convey through the passage 12 in the floor 14; allows for the attaining of a maximum sealing effect in the presence of high heat.

From the foregoing it becomes readily apparent that the invention is directed to a simple and inexpensive poke-through fire barrier structure of the novel construction described hereinabove which is adapted to be employed in numerous installations of the type contemplated in the construction of buildings having fire-rated floors, without the need for modifying or retrofitting exiting structures.

While there has been shown and described herein what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A fire retarding structure for installation with feed-through fittings for the transferring of at least one insulated conductor through a passage formed in a fire-rated floor, said fire retarding structure comprising at least one disc member constituted from an intumescent material, said disc member having a plurality of knock-outs of integral construction formed therein, said knock-outs being of varying sizes and arranged in spaced relationships to each other in said disc member, said knock-outs being selectively removable in response to a requirement for passing said at least one said insulated conductor through said disc member, said selected knock-out in said disc member being sized in conformance with the external dimensions of said at least one insulated conductor which is to be passed through said disc member.

2. A fire retarding structure as claimed in claim 1, wherein each said knock-out comprises a plug which is integral with the material of said disc member; and at least one frangible connecting web retaining said knock-out in said disc member.

3. A fire retarding structure as claimed in claim 2, wherein said at least one frangible connecting web is formed by cutting the configuration of said knock-out into both sides of said disc member while leaving uncut material in the center of the thickness of said disc member.

4. A fire retarding structure as claimed in claim 1, wherein said intumescent material comprises between about 70% to 100% of an intumescing binder and between about 0% to 30% by weight of a filler.

5. A fire retarding structure as claimed in claim 4, wherein said intumescing binder is selected from the group of materials consisting of sodium silicate and potassium silicate.

6. A fire retarding structure as claimed in claim 4, wherein said filler is selected from the group of materials consisting of clay and cellulatable glass.

7. A fire retarding structure as claimed in claim 1, wherein a plurality of said disc members of intumescent material are superimposed in the passage of the floor so as to form said fire barrier.

8. A fire retarding structure as claimed in claim 7, wherein said plurality of disc members are arranged in spaced relationship with respect to each other.

* * * * *